US008422339B2

(12) United States Patent
Martin et al.

(10) Patent No.: US 8,422,339 B2
(45) Date of Patent: Apr. 16, 2013

(54) LOW FRICTION LUBRICATION ASSEMBLY

(75) Inventors: Jean Michel Martin, Chazay d'azergues (FR); Makoto Kano, Yokohama (JP); Takumaru Sagawa, Yokohama (JP); Masahiko Watanabe, Kawagoe (JP); Yutaka Mabuchi, Yokohama (JP)

(73) Assignees: Nissan Motor Co., Ltd., Kanagawa (JP); Jean Michel Martin, Chazay d'Azergues (FR)

( * ) Notice: Subject to any disclaimer, the term of this patent is extended or adjusted under 35 U.S.C. 154(b) by 172 days.

(21) Appl. No.: 12/298,665

(22) PCT Filed: Apr. 27, 2007

(86) PCT No.: PCT/JP2007/059178
§ 371 (c)(1),
(2), (4) Date: Oct. 27, 2008

(87) PCT Pub. No.: WO2007/126057
PCT Pub. Date: Nov. 8, 2007

(65) Prior Publication Data
US 2009/0186783 A1    Jul. 23, 2009

(30) Foreign Application Priority Data

Apr. 28, 2006  (JP) ................................. 2006-125623
Aug. 31, 2006  (JP) ................................. 2006-234759

(51) Int. Cl.
*G04B 31/08*    (2006.01)
*C10M 105/14*   (2006.01)
(52) U.S. Cl.
USPC ............. 368/62; 508/583; 508/109; 508/391

(58) Field of Classification Search .................. 508/391, 508/100, 109, 583; 368/62
See application file for complete search history.

(56) References Cited

U.S. PATENT DOCUMENTS 5,300,951 A *  4/1994  Yamazaki .................... 347/263
6,806,242 B2  10/2004  Shirahama et al.
6,858,567 B2   2/2005  Akao
(Continued)

FOREIGN PATENT DOCUMENTS

EP    1 201 734 A1    5/2002
EP    1 338 641 A1    8/2003
(Continued)

OTHER PUBLICATIONS

Robertson, J., in Tribology of Diamond-like Films, Donnet, C., Erdemir, A., Eds., Springer, 2008, p. 14.*

(Continued)

*Primary Examiner* — Jim Goloboy
(74) *Attorney, Agent, or Firm* — Foley & Lardner LLP

(57) ABSTRACT

[Object] A low friction assembly is desired.
[Solving Means] The present invention relates to a new low-friction lubrication assembly comprising a first member relatively slidable against a second member, the first member having chemical affinity with an OH-group on its sliding surface; and one or more oxygen containing compounds, provided on the sliding surface of the first member and being able to produce a tribofilm attached to the sliding surface of the first member through hydrogen bond interactions. Preferably the second member comprises a similar OH-terminated sliding surface wherein an oxygen containing compound (lubricant)-supported interface between the first and second sliding surfaces results in a H- and/or OH-terminated interface developing repulsive forces thereinbetween.

3 Claims, 13 Drawing Sheets

U.S. PATENT DOCUMENTS

| | | | |
|---|---|---|---|
| 2002/0191493 A1* | 12/2002 | Hara | 368/140 |
| 2004/0241448 A1 | 12/2004 | Kano et al. | |
| 2005/0025975 A1 | 2/2005 | Okamoto et al. | |
| 2005/0064196 A1 | 3/2005 | Martin et al. | |
| 2005/0082139 A1* | 4/2005 | Ishikawa et al. | 192/107 M |
| 2005/0084390 A1 | 4/2005 | Ueno et al. | |
| 2005/0100701 A1 | 5/2005 | Hamada et al. | |
| 2006/0240996 A1 | 10/2006 | Hayashi et al. | |
| 2006/0263604 A1* | 11/2006 | Martin et al. | 428/408 |
| 2009/0186783 A1 | 7/2009 | Martin et al. | |

FOREIGN PATENT DOCUMENTS

| | | | |
|---|---|---|---|
| EP | 1 510 594 A2 | | 3/2005 |
| EP | 1 201 734 B1 | | 6/2006 |
| JP | 52-008857 | | 1/1977 |
| JP | 8-225795 A | | 9/1996 |
| JP | 10-204466 A | | 8/1998 |
| JP | 2003-238982 A | | 8/2003 |
| JP | 2004-262960 A | | 9/2004 |
| JP | 2004-359727 A | | 12/2004 |
| JP | 2005-061610 A | | 3/2005 |
| JP | 2005-089735 A | | 4/2005 |
| JP | 2005-090738 | | 4/2005 |
| JP | 2005-097570 A | | 4/2005 |
| JP | 2005-098289 A | | 4/2005 |
| JP | 2005-098495 A | | 4/2005 |
| JP | 2005098495 A | * | 4/2005 |
| JP | 2006-213745 | | 8/2006 |
| WO | WO-01/59043 A1 | | 8/2001 |
| WO | WO-2007/126057 | | 11/2007 |

OTHER PUBLICATIONS

Walters, J.K., Gilkes, K.W.R., Wicks, J.D., Newport, R.J., "Progress in modeling the chemical bonding in tetrahedral amorphous carbon", Phys. Rev. B, 1998, 58(13), 8267-8276.*

F. J. Clough, B. Kleinsorge, W. I. Milne and J. Robertson (1996). Tetrahedral Amorphous Carbon Thin Film Transistors. MRS Proceedings, 423, 39 doi:10.1557/PROC-423-39.*

Japanese Industrial Standard, "Chromium Molybdenum Steels," JIS G 4105, 1979, pp. 1-11.

Japanese Industrial Standard, "High carbon chromium bearing steels," JIS G 4805, 1999, pp. 1-31.

Anderson et al., "Frictional behavior of diamondlike carbon films in vacuum and under varying water vapor pressure", Surface and Coatings Technology, 2003, 163-164, pp. 535-540.

Yasuda et al., "Ultralow friction of DLC in presence of glycerol mono-oleate (GMO)", Tribology Letters, 2005, vol. 18(2), pp. 245-251.

Andersson, J. et al., "Frictional behavior of diamondlike carbon films in vacuum and under varying water vapor pressure", Surface and Coatings Technology, 2003, vols. 163-164, pp. 535-540.

Kano, M., et al. "Ultralow friction of DLC in presence of glycerol mono-oleate (GMO)", Tribology Letters, Feb. 2005, vol. 18, No. 2, pp. 245-251.

Office Action in JP Appln No. 2008-513293 dated Jul. 1, 2011.

"About Testing method for Watch Oils", The Horological Institute of Japan, Dec. 15, 1959, pp. 1-11.

Kakuta K. "World of Friction—Macro and Micro—Tribology", Journal of the Horological Institute of Japan, 1996, No. 159, pp. 41-48.

Kano, M. et al. "Ultralow friction of DLC in presence of glycerol mono-oleate (GMO)", Tribology Letters, Feb. 2005, vol. 18, No. 2, pp. 245-251.

Office Action in JP Appln No. 2006-263818 dated Nov. 15, 2011.

Office Action Japanese Patent Application No. 2006-263818 dated May 29, 2012.

Yuji Akao, "Development for New Lubricant for Watch Mechanism", Dec. 20, 2000, Micromechatronics, vol. 45, No. 1, 2001, pp. 27-33.

* cited by examiner (..... INDICATES HYDROGEN BOND)

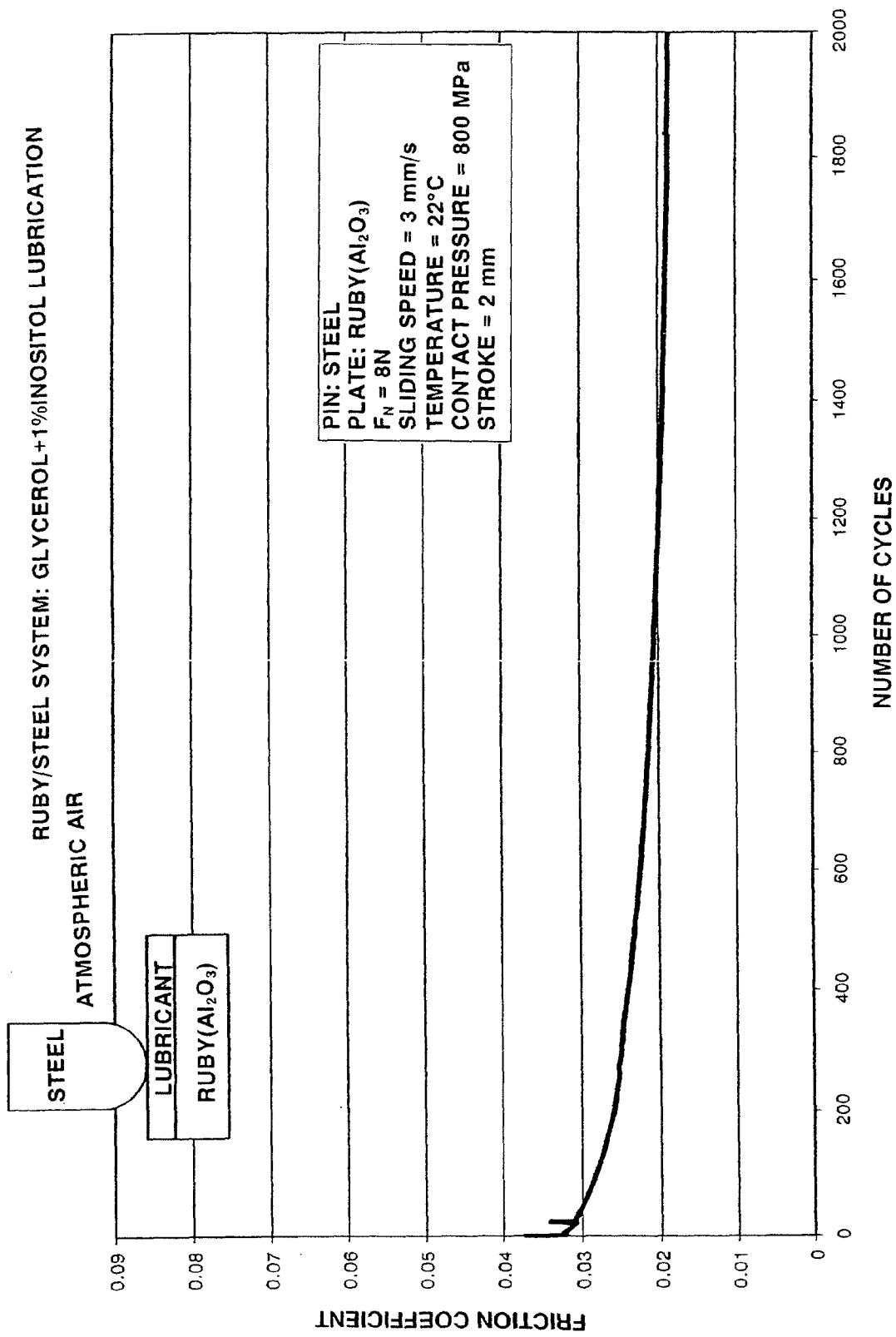

LOW FRICTION LUBRICATION ASSEMBLY

TECHNICAL FIELD

The present invention relates to a low-friction lubrication assembly comprising at least first and second members, the surfaces or coatings thereof are in sliding contact with each other such that under presence of at least one friction reducing agent (oxygen containing compound) a specific and unique tribofilm develops comprising hydrogen and/or hydroxyl groups.

BACKGROUND ART

In the present state of the art, low friction under lubricated tests is generally attainable through the formation of $CH_3$-terminated tribofilms or in the presence of solid lamellar compounds such as $MoS_2$ or boric acid, for example. However, almost typical friction coefficients obtained are not lower than 0.04 and lower than 0.1, and therefore values lower than 0.04 have hardly been reported so far.

Global environmental problems such as global warming and ozone layer destruction are coming to the fore. As it has been said that the global warming is significantly affected by $CO_2$ emission, the reduction of $CO_2$ emission, notably the setting of $CO_2$ emission standards, has become a big concern to each country. One of the challenges to reduce $CO_2$ emission is to lower an energy loss due to friction loss of machines, facilities and the like, particularly to improve vehicle fuel efficiency or fuel economy that depends on the performance of engine sliding members and a lubricating oil applied thereto. There are the following approaches to improve the vehicle fuel efficiency: (1) lowering the viscosity of the lubricating oil, thereby reducing viscous resistance in hydrodynamic lubrication regions and agitation resistance in the engine; and (2) adding a suitable friction modifier and other additives into the lubricating oil so as to reduce friction losses under the conditions of mixed lubrication and boundary lubrication.

A patent literature 1 discloses a low-friction sliding member with a base material having a surface and a hard carbon thin film formed on at least a part of the surface of the base material, wherein a tribofilm having at least one functional group selected from the group consisting of an ether linkage, an oxido and a hydroxyl group is formed on the hard carbon thin film when the hard carbon thin film is in slidable contact with an opposite member in the presence of an organic oxygen-containing compound.

The patent literature 1: European Patent No. 1510594A specification

DISCLOSURE OF THE INVENTION

Problems to be Solved by the Invention

The present invention aims to suggest a low-friction lubrication assembly showing improved sliding characteristics over low friction assemblies shown in the art.

Means for Solving the Problems

The problem is solved with a low friction assembly comprising:

a first member relatively slidable against a second member, the first member having chemical affinity with an OH-group on its sliding surface; and one or more oxygen containing compounds located on the sliding surface of the first member and being able to produce a tribofilm to be located on the sliding surface of the first member having the chemical affinity, through hydrogen bond interactions with the OH-group.

The Best Mode for Carrying out the Invention

Hereinafter, a low friction assembly of the present invention will be discussed in detail.

As discussed above, the low friction assembly of the present invention comprises:

a first member relatively slidable against a second member, the first member having chemical affinity with an OH-group on its sliding surface; and one or more oxygen containing compounds located on the sliding surface of the first member and being able to produce a tribofilm to be located on the sliding surface of the first member having the chemical affinity, through hydrogen bond interactions with the OH-group.

Essential is the creation of a hydrogen bond interaction between a H or OH-terminated surface of the first member and specific polar molecules present in an oxygen containing compound (lubricant) which can be gaseous or liquid. In particular, said hydrogen bonding interaction, on the one hand, and the oxygen containing compound (lubricant) determined H-terminated surfaces of the first and/or second member, on the other hand, serve to establish a unique low-friction lubrication assembly or system which allows to reduce friction values to the range of friction coefficient below 0.04 and in specific cases below 0.01.

On other words, in a two-way mechanism the tribochemical reaction of the surface atoms such as C, Al, Si, etc of the first and/or second member with the hydroxyl groups present in the molecules of the oxygen containing compound (lubricant) occurs and thereafter the oxygen containing compound (lubricant) molecules adsorb on that OH-terminated surface by hydrogen bonding. Thus the newly created friction interface (including the oxygen containing compound (lubricant)) is either an H-terminated surface or a mixed OH— and/or H-terminated surface wherein any amount of more than 50% OH may be beneficial over a purely H-terminated surface.

In case of biological material, for example as a second member, proteins comprising for example OH- and SH-groups, may organize on the OH- or H-terminated surface of the first member.

In a preferred embodiment, the second member further comprises a hydroxyl group on the sliding surface, preferably an OH-terminated sliding surface, and the tribofilm is also attached to the sliding surface of the second member through hydrogen bonding in response to a sliding movement. Further, the first member comprises preferably at least one selected from the group consisting of an amorphous material and a crystallized material.

In a further preferred embodiment the first member comprises at least one selected from the group consisting of Si, $SiO_2$, $Al_2O_3$, $Si_3N_4$, MgO or any single metal or mixed metal combination of oxides, nitrides and carbides (for example silicon carboxide, oxynitride and carbonitride) and more generally a material formed of elements having a chemical affinity and propension to form hydroxides compounds (for example Metal (OH)x). Which ever its chemical composition and crystal structure, the first sliding member can also be coated with a diamond and diamond-like carbon.

The diamond-like carbon contains preferably hydrogen in an amount of not more that 10 atomic %, more preferably the diamond-like carbon is formed of diamond-like carbon of a-C type or ta-C type containing substantially no hydrogen.

The second member comprises preferably at least one selected from the group consisting of an amorphous material and a crystallized material.

In a further preferred embodiment, the second member is formed of the same materials as those (as listed above) of the first member, or comprises at least one selected of the group consisting of C, Fe, Al, Mg, Cu, Fe alloy, Al alloy, Mg alloy and Cu alloy.

Preferably, the oxygen containing compound (friction modifier or lubricant) has at least one hydroxyl group in its chemical formulae.

Further, the oxygen containing compound comprises preferably at least one of the group consisting of an alcohol, a carboxylic acid, an ester, an ether, a ketone, an aldehyde and a carbonate, and/or a derivative of at least one of the group consisting of an alcohol, a carboxylic acid, boric acid, an ester, an ether, a ketone, an aldehyde and a carbonate.

In a further preferred embodiment, the oxygen containing compound comprises at least one selected from the group consisting of poly alpha-olefin (PAO), glycerol monooleate (GMO), glycerol, $H_2O$ and peroxides, more preferably the oxygen containing compound comprises $H_2O_2$ or a mixture of $H_2O$ and $H_2O_2$, in particular $H_2O_2$. In another preferred embodiment the oxygen containing compound (lubricant) is glycerol. In still another preferred embodiment, the oxygen containing compound (lubricant) is found in synovial liquid, in particular lubricin-OH. In a further preferred embodiment the oxygen containing compound (lubricant) is PAO-ester.

In a further preferred embodiment, the oxygen containing compound comprises polyalcohols which include at least one selected from the group consisting of inositol, pyrogallol, urushiol, pyrocatechol, resorcinol, hydroquinone, fullerenol, penthaerythritol, other saccharides, their isomers, derivatives and substitution compounds. Examples of the above-mentioned saccharides are agarose, adenosine triphosphate, apiose, amylase, amylopectin, sugar glass, arabinoxylan, alkylglycoside, alginic acid, sodium alginate, aldaric acid, aldose, altrose, aldonic acid, arbutin, allose, idose, inulin, uronic acid, erythritol, erythrose, oligosaccharide, carrageenan, galactose, carboxymethyl cellulose, reducing sugar, xanthan gum, rare sugar, xylan, xylitol, xylulose, xylose, cycloglucan, chitin, chitosan, guar gum, glycogen, glycosaminoglycan, glycosyl group, glyceraldehyde, glucuronoxylan, glucuronolactone, glucuronic acid, glucosamine, glucose, glucomannan, gluconic acid, gulose, ketose, kerato sulfate, gentiobiose, collodion, chondroitin, chondroitin sulfate, saponin, digitonin, cycloawaodorin, cyclodextrin, cytidylic acid, sinigrin, dihydroxy acetone, starch nitrate, cane sugar, GF2, sucralose, sucrose, refined sugar, cellulose, cellulose ester, cellobiose, thickening agent, sorbitol, sorbose, tagatose, polysaccharide, talose, monosaccharide, deoxyribose, dextrin, dermatan sulfate, invert sugar, starch, sugar alcohol, glycoprotein, threose, trehalose, nicotinamide adenine dinucleotide phosphate, nicotinamide adenine dinucleotide, disaccharide, glycoside, hyaluronic acid, fucoidan, fucose, psicose, ptaquiloside, fructose, pectin, heparin, hemicellulose, maltose, mannitol, mannose, lactose, rhamnose, lyxose, ribulose, ribose, rutin and the like.

In a further preferred embodiment, the oxygen containing compound comprises a mixture of at least one of the above-listed polyalcohols and glycerol.

In a further preferred embodiment, the oxygen containing compound comprises a mixture of at least one of the above-listed polyalcohols and $H_2O$.

Preferably, the oxygen containing compound is liquid or gaseous, nanoparticles or thin organic deposited films by any available deposition techniques (Langmuir Blodgett films for example).

Preferably, the sliding surface of the first member is subject to pretreatment before being slid against the second member.

Contaminants (contamination substances) such as fats and oils and the like will be felt uneasy particularly in processing (high precision processing) for precision machines or in precision machines per se; however, such contaminants cannot be present if volatile substances such as $H_2O_2$, alcohol or the like is used as the oxygen containing compound (lubricant). Accordingly, it will be understood that the oxygen containing compound is effective for the sliding action (sliding action, for example, in a step of removing a metal die) in a processing step for precision machines such as "watches" and the like, or effective for sliding sections of the precision machines. The oxygen containing compound tends to easily volatilize particularly in cold and warm climates thereby being optimum in contaminant preventing effect. The above-mentioned high precision processing includes a cold processing and a warm processing. The cold processing is a plastic working at a temperature lower than a recrystallization temperature of a metal. The warm processing is a plastic working upon heating a metal material in a temperature range lower than the recrystallization temperature.

Preferably, said pretreatment comprises cleaning; mechanical activation, in particular polishing with specific agent such as $H_2O_2$; chemical treatment, in particular by application of $H_2O_2$ after physical treatment by laser or electron beam treatment.

Preferably, the sliding surface of the first member is hydrogen-free before application of the oxygen containing compound (OH group containing lubricant) and establishing sliding contact to the second member but build an OH-terminated sliding surface upon entering into sliding contact with the second member, under preceding or simultaneous application of the above-mentioned oxygen containing compound (OH group containing lubricant) on the sliding surface of the first member.

The low-friction lubrication assembly of the present invention is suitable for any application wherein very low friction between two members is desired. The assembly can for example be used in the field of mechanics, physics or medicine. In particular, the assembly is suitable for use in a combustion engine, medical devices (endoscope, catheter, syringe, needle, blood collection tube, medical electronic pump and the like), micromechanical devices, and nanomechanical devices (MEMS; Micro Electromechanical System, NEMS; Nano Electromechanical System, particularly precision machines such as watches or the like), and other low friction requiring systems (shavers, compressors, pumps, gears, bearings and the like). Additionally, tools to be used for machining may encounter a problem in which friction and adhesion occur not only in cutting sections but also at the face and flank thereof due to cutting pieces rolled in; however, by virtue of these low friction assemblies, reduction in driving force during the machining can be expected while a tool life can be largely extended owing to preventing the adhesion.

Regarding the first and second members of the new low friction assembly, a wide variety of materials and combinations is given. Accordingly, the present invention is primarily focused on determining the first member while the second member can reach from biological material, such as for example considering the lubrication assembly being formed by a medicine endoscope and the skin surface of the human body or the surface of inner vessels of the human body up to applications where metals or metal coated surfaces slide on each other such as, machine tooling or engine design, such as sliding components in internal combustion engines. Preferably, at least the first member comprises a smooth surface, said surface being comprised of a thin layer coating such as DLC coating on metal or semi-metal comprising base materials.

The low friction properties of the new system are considered to be based on the unique combination of a sliding surface of the first member comprising an OH-terminated surface, at least after having been in contact with an oxygen containing compound (OH-group containing lubricant), said OH-terminating surface being able to establish hydrogen bonding with a gaseous or liquid lubricant, such as glycerol. The OH-terminated sliding surface is adapted to oppose an OH-terminated opposite surface either established by the lubricant deposition of OH-group on the sliding surface of the second member or the sliding surface of the second member itself establishing an interactive hydrogen bond between the OH-terminated sliding surface of the first and second member and the OH-groups of the oxygen containing compound (lubricant). Preferably, DLC coatings are being used on the side of the first member.

Preferably, there will be a pretreatment of the sliding surface of at least the first member to reduce roughness and install OH hydroxyl groups on the polished surface.

Hereinafter, the present invention is explained in further detail by means of several embodiments thereof in conjunction with the accompanying drawings.

In FIGS. 1 and 2, the new surface chemistry (called OH-tribofilm) is formed on both sliding surfaces by a tribochemical reaction between the materials of the first and second members and the oxygen containing compound (lubricant) present therebetween during sliding of the first and second members. Alternatively, it can be formed by a pre-treatment of the surface before use, "pre-treatment" can be chemical, vacuum assisted cleaning and reaction with specific agents and even mechanical polishing in the presence of the agents or a combination of the three.

Such treatment can be of mechanical (polishing), chemical or mechanochemical ($H_2O_2$), or other cleaning or physical nature (electron or ion bombardment) all intended for activating atoms present at the sliding surface.

Preferably, the thickness of the OH-tribofilm is usually in the nanometer range and the OH-tribofilm has a termination made both of hydroxyl groups (OH) and H atoms but even more preferably the termination is made of OH-atoms. It is much preferable to have more than 50% of OH groups on the surface. Even more favorable is 100% of OH groups.

The OH-tribofilm can advantageously form hydrogen bonding with various molecules such as alcohols, esters, ethers, acids, amines, imides, thiols, peroxides and water, and others (boric acid for example). Generally, all molecules susceptible to have hydrogen bonding with water can be candidates.

The termination of the OH-tribofilm with the hydrogen bond-attached molecules has preferably a H-terminated surface.

It has been confirmed that the friction between such H-terminated and OH terminated surfaces is extremely low due to the repulsive forces between positively charged hydrogen atoms. Because of the electronegativity of oxygen atoms, the OH-terminated surface is even more repulsive.

The OH-tribofilm is continuously re-formed if it is needed by the tribochemical reaction.

Due to hydrogen termination between the two sliding surfaces formed by the oxygen containing compound (lubricant) in between, repulsive forces are formed in between the contacting sliding surfaces, the first and second member which is even increased in case of hydroxyl group termination between the two sliding surfaces which is also preferred in view of a high flexibility of a COH-bonding with the OH compound being free to rotate around a C—O bond to assume a stationary position. As compared with well known "OH-terminated surface" having a high surface energy and the property of being not wetted with water within hydrogen bond, "C—OH terminated surface" has a low surface energy and the property of tending to be wetted with water. The reason for this is supposed that "C—H terminated surface" is very strong, and "H" of "C—H terminated surface" cannot form a hydrogen bond with a water molecule under steric hindrance. In this regard, in the hydrogen bond of "C—H—O", it is preferable that three atoms are generally in alignment with each other. In contrast, as shown in FIG. 7, "C—O—H terminated surface" of ta-C has a considerable degree of freedom because C—O bond is rotatable, and therefore the position of water molecule (H—O—H) capable of being formed by hydrogen bond with OH group of glycerol at the surface is optimized so as to readily form hydrogen bond.

Preferably, glycerol is used as the oxygen containing compound (lubricating agent) and, due to having 3OH groups and capable of having three hydrogen bonds per module, allows the molecule to stay longer on a OH terminated surface but having some repulsiveenergy as C—O and C—C bonds are free to rotate around their axle. A glycerol lubricating system can optimize its configuration to have better hydrogen bonding situations considering the different bonding forces in view of the preferred alignment of O—H—O groups. Generally, H-terminated surfaces between the first member and the oxygen containing compound (lubricant) and/or between the first and second members appear to be more preferable than the provision of OH-terminated surfaces.

In preferred embodiments of the present invention the first member has a coating of a hydrogen free amorphous carbon layer (a-C) or a hydrogen free tetrahedral carbon layer (ta-C). The second member has preferably also a coating of a hydrogen free amorphous carbon layer (a-C) or a hydrogen free tetrahedral carbon layer (ta-C). Particularly preferred are the following combinations of first and second members: a-C coating and a-C coating; ta-C coating and a-C coating; a-C coating and ta-C coating; ta-C coating and ta-C coating. Particularly preferred base materials on which to apply these coatings are SCM415 (carburization) or heat treated SUJ2. The above-mentioned a-C and ta-C are respectively located in ranges shown in a ternary state diagram of FIG. 8.

A preferred oxygen containing compound (lubricant) for these members is glycerol.

The hydrogen-free carbon layer such as DLC reacts with OH-groups of the oxygen containing compound (lubricant) immediately upon contact with the oxygen containing compound (lubricant). This leads to the formation of an OH-terminated sliding surface.

FIG. 3 represents a model of the new low-friction lubrication assembly comprising a 100% H-terminated surface of the first and second member, wherein the repulsive affinity therebetween drastically reduces a friction coefficient. This will be apparent from FIG. 4 which is experimental data shows performances of a hydrogen-free DLC (substantially containing no hydrogen; ta-C) and hydrogen-free DLC system using a glycerol lubrication. Alternatively, the friction interface along the dotted line between the first and second members in FIG. 2 may also comprise OH-groups to establish a mixture of H- and OH-termination of the surfaces of the first and second members, thus forming a repulsive interface between the H- and/or OH-terminated surfaces of the opposite members upon relative sliding of same with respect to each other.

With DLC and other materials of interest in particular as the first and second members, a two-steps mechanism is provided: first the creation of an OH-terminated surface based on the tribochemical reaction of surface atoms of the members, such as C, Se, Si, etc. with the hydroxyl groups present in the members of the oxygen containing compound (lubricant). Then the molecules of the oxygen containing compound (lubricant) may adsorb on that crated OH-terminated surface by hydrogen bonding creating a new friction interface of the first and/or second member comprising an H- and/or OH-terminated surface is developed. Thus, repulsive forces along said interface facilitate a new type of low friction lubricated assembly to be created.

Hereinafter, the present invention will be discussed with reference to Examples and Comparative Examples; however, the present invention is not limited to these Examples.

EXAMPLES 1 TO 9 AND COMPARATIVE EXAMPLES 1 TO 4

Plates and pins shown in Table 2 were produced respectively by forming coatings on base materials thereof. Respective produced plates and pins had respectively film thicknesses, surface roughnesses and surface hardnesses as shown in Table 2, similarly.

(Vibration Friction Wear Test (SRV Friction Test))

The obtained plate and pin were set on a vibration friction wear testing machine produced by Optimol Instruments Prüftechnik GmbH, upon which the plate and pin were wetted with a lubricating oil (oil) and underwent a vibration friction wear test (SRV (pin-on-plate) friction test) thereby measuring a friction coefficient. An obtained result is also shown in Table 2.

FIG. 6 is a perspective explanatory view showing the manner of the vibration friction wear test (SRV (pin-on-plate) friction test). As shown in this figure, the pin is located on the plate, upon which the pin slidingly moves in a reciprocating manner on the plate. A vertical arrow A indicates a load direction (the upper side to the lower side; vertical direction), and a horizontal arrow indicates a direction (horizontal direction) in which the pin slides on the surface of the plate.

TABLE 1

| Experiment with Glycerol Test condition | |
|---|---|
| Maximum hertzian contact pressure | 270 MPa |
| Temperature | 80° C. |
| Amplitude | 3 mm |
| Number of vibration | 50 Hz |
| Test time | 15 minutes |

TABLE 2

Examples/Comparative Examples with Glycerin

| Example | Sliding members for pin-on-disc friction test | | | | Film thickness [μm] | | Surface hardness [Hv] | | Surface roughness Ra [μm] | | lubricating oil | Friction coefficient |
|---|---|---|---|---|---|---|---|---|---|---|---|---|
| | disc | | pin | | | | | | | | | |
| | base material | coating | base material | coating | disc | pin | disc | pin | disc | pin | | |
| EX. 1 | SCM415 (carburization) | a-C | Heat treated SUJ2 | a-C | 0.7 | 1.1 | 1500 | 1600 | 0.03 | 0.03 | Glycerin | 0.009 |
| EX. 2 | SCM415 (carburization) | a-C | heat treated SUJ2 | a-C | 0.8 | 1.8 | 1600 | 1800 | 0.03 | 0.03 | Glycerin | 0.008 |
| EX. 3 | SCM415 (carburization) | a-C | heat treated SUJ2 | a-C | 0.8 | 0.9 | 1600 | 1500 | 0.05 | 0.05 | Glycerin | 0.008 |
| EX. 4 | SCM415 (carburization) | a-C | heat treated SUJ2 | ta-C | 0.9 | 0.9 | 1600 | 2800 | 0.05 | 0.05 | Glycerin | 0.008 |
| EX. 5 | SCM415 (carburization) | ta-C | heat treated SUJ2 | ta-C | 1.1 | 0.9 | 2900 | 2800 | 0.04 | 0.05 | Glycerin | 0.007 |
| EX. 6 | SCM415 (carburization) | ta-C | heat treated SUJ2 | ta-C | 1.1 | 0.8 | 2900 | 2700 | 0.05 | 0.02 | Glycerin | 0.007 |
| EX. 7 | SCM415 (carburization) | ta-C | heat treated SUJ2 | ta-C | 0.9 | 1.1 | 2800 | 2900 | 0.05 | 0.03 | Glycerin | 0.007 |
| EX. 8 | WC—Co (super hard alloy) | ta-C | heat treated SUJ2 | ta-C | 0.3 | 0.9 | 2800 | 3500 | 0.05 | 0.10 | Glycerin | 0.007 |
| EX. 9 | WC—Co (super hard alloy) | ta-C | heat treated SUJ2 | ta-C | 0.7 | 0.3 | 3200 | 2900 | 0.05 | 0.04 | Glycerin | 0.007 |
| Comp. Ex. 1 | SCM415 (carburization) | a-C | heat treated SUJ2 | none | 0.8 | | 1600 | 750 | 0.10 | 0.03 | Glycerin | 0.02 |
| Comp. Ex. 2 | SCM415 (carburization) | ta-C | heat treated SUJ2 | none | 0.8 | | 2700 | 750 | 0.04 | 0.03 | Glycerin | 0.03 |
| Comp. Ex. 3 | SCM415 (carburization) | ta-C | heat treated SUJ2 | ta-C | 0.8 | 1.1 | 2700 | 2900 | 0.10 | 0.03 | 5W-30 engine oil | 0.06 |
| Comp. Ex. 4 | SCM415 (carburization) | None | heat treated SUJ2 | none | | | 710 | 750 | 0.05 | 0.03 | 5W-30 engine oil | 0.14 |

In further preferred embodiments of the present invention the first member is made of steel, DLC coated steel or $Al_2O_3$. Preferably, the second member is also made of steel, DLC coated steel or $Al_2O_3$. Particularly preferred are the following combinations of first and second members: steel and $Al_2O_3$; DLC/steel and $Al_2O_3$; DLC/$Al_2O_3$ and DLC/$Al_2O_3$; steel and steel; $Al_2O_3$ and $Al_2O_3$; $Al_2O_3$ and DLC/$Al_2O_3$; DLC/steel and steel; DLC/$Al_2O_3$ and steel; DLC/steel and DLC/steel.

A preferred lubricant for these members is glycerol. The following Table 3 contains experimental data for a combination of glycerol as lubricant with members made of steel, DLC coated steel and $Al_2O_3$.

TABLE 3

Glycerol lubrication

| Ball or pin | Plate or disc | Contact pressure (MPa) | Sliding speed (mm/s) | Mean friction ($\mu$) | $\Delta\mu$ | Wear |
| --- | --- | --- | --- | --- | --- | --- |
| Steel | $Al_2O_3$ | 395 | 1 | 0.04 | ±0.03 | No measurable * |
| DLC/Steel (200 nm) | $Al_2O_3$ | 395 | 1 | 0.06 | ±0.005 | Tribofilm |
| DLC/$Al_2O_3$ (200 nm) | DLC/$Al_2O_3$ (200 nm) | 727 | 1 | 0.06 | ±0.02 | Wear (Removal of the coating) |
| Steel | | 340 | 1 | 0.22 | ±0.005 | Wear |

* The term "No measurable" in Table 3 refers to a "tribofilm thickness being below 10 nm, which cannot be observed by eyes or even conventional optical microscopy.

A further preferred oxygen containing compound (lubricant) for these members is PAO-ester. The following Table 4 contains experimental data for a combination of PAO-ester as the oxygen containing compound (lubricant) with members made of steel, DLC coated steel and $Al_2O_3$.

TABLE 4

PAO-Ester lubrication

| Ball or pin | Plate or disc | Contact pressure (MPa) | Sliding speed (mm/s) | Mean friction ($\mu$) | $\Delta\mu$ | Wear |
| --- | --- | --- | --- | --- | --- | --- |
| Steel | $Al_2O_3$ | 395 | 1 | 0.075 | ±0.025 | No visible |
| DLC/Steel (900 nm) | $Al_2O_3$ | 395 | 1 | 0.05 | ±0.005 | Brown Tribofilm * |
| DLC/$Al_2O_3$ (200 nm) | DLC/$Al_2O_3$ (200 nm) | 725 | 1 | 0.05 | ±0.001 | Wear (Removal of the coating) |
| DLC/Steel (20 AP) | DLC/Steel (20 AP) | 548 | 2-3 | 0.08 | ±0.01 | Hardly visible |

The combination of DLC/Steel and $Al_2O_3$ with the lubricant PAO-ester is particularly preferred.
* The term "Brown Tribofilm" in Table 4 refers to "film, being visible by optical microscopy".

FIG. 5 is an experimental data in case of the above-mentioned hydrogen-free DLC and hydrogen-free DLC system using a gaseous $H_2O_2$ lubrication, in which the friction coefficient is drastically lowered.

In case of using PAO-ester or glycerol lubrication, the friction coefficient is largely lowered even in a ruby ($Al_2O_3$)/hydrogen-free DLC system. This is apparent from FIG. 9 and FIG. 10. FIG. 9 is an experimental data showing the performance of the ruby ($Al_2O_3$)/hydrogen-free DLC system using the glycerol lubrication. FIG. 10 is an experimental data showing the performance of the ruby ($Al_2O_3$)/hydrogen-free DLC system using the PAO-ester lubrication.

Additionally, in case of using PAO-ester or glycerol lubrication as same as the above, the friction coefficient is largely lowered even in a ruby ($Al_2O_3$)/steel (Fe; iron) system. This is apparent from FIG. 11 and FIG. 12. FIG. 11 is an experimental data showing the performance of the ruby ($Al_2O_3$)/steel system using the glycerol lubrication. FIG. 12 is an experimental data showing the performance of the ruby ($Al_2O_3$)/steel system using the PAO-ester lubrication.

Hereinafter, technical bases of the present invention derived from the above-discussed embodiments will be discussed.

(1) A low-friction lubrication assembly comprising: a first member relatively slidable against a second member, the first member having chemical affinity with an OH-group on its sliding surface; and one or more oxygen containing compounds located on the sliding surface of the first member and being able to produce a tribofilm to be located on the sliding surface of the first member having the chemical affinity, through hydrogen bond interactions with the OH-group.

(2) A low-friction lubrication assembly as described in (1), wherein the second member further has chemical affinity with an OH group, and the tribofilm is also able to be formed on a sliding surface of the second member through hydrogen bond interactions with the OH-group in response to sliding motion.

(3) A low-friction lubrication assembly as described in (1), wherein at least one OH group termination is provided onto the sliding surface in the first member after a certain sliding motion.

(4) A low-friction lubrication assembly as described in (1) or (3), wherein the tribofilm is formed to be located on the sliding surface of the first member through hydrogen bond interactions between at least one OH termination provided to the surface of the first member and an OH group in the oxygen containing compound.

(5) A low-friction lubrication assembly as described in any of (1) to (4), wherein at least one OH group termination is further provided onto the sliding surface of the second member after a certain sliding motion.

(6) A low-friction lubrication assembly as described in (1) to (5), wherein the tribofilm is further formed to be located on the sliding surface of the second member through hydrogen bond interactions between at least one OH termination provided to the surface of the second member and an OH group in the oxygen containing compound.

(7) A low-friction lubrication assembly as described in any of (1) to (6), wherein the first member comprises at least one selected from the group consisting of an amorphous material and a crystallized material.

(8) A low-friction lubrication assembly as described in any of (1) to (7), wherein the first member comprises at least one selected from the group consisting of Si, $SiO_2$, $Al_2O_3$, $Si_3N_4$, MgO or any single metal or mixed metal combination of oxides, nitrides and carbides.

(9) A supper low-friction lubrication assembly as described in any of (1) to (8), wherein the first member comprises at lease one selected from the group consisting of silicon carboxide, oxinitride and carbonitride, a material formed of elements having a chemical affinity and tendency to form hydroxides (for example Metal (OH)x), diamond and diamond-like carbon.

(10) A low-friction lubrication assembly as described in (8) or (9), wherein the diamond-like carbon contains hydrogen in an amount of not more that 10 atomic %.

(11) A low-friction lubrication assembly as described in (10), wherein the diamond-like carbon is formed of diamond-like carbon of a-C type containing substantially no hydrogen or diamond-like carbon of ta-C type.

(12) A low-friction lubrication assembly as described in any of (1) to (11), wherein the second member comprises at least one selected from the group consisting of an amorphous material and a crystallized material.

(13) A low-friction lubrication assembly as described in any of (1) to (12), wherein the second member comprises at least one selected from the group consisting of Si, $SiO_2$, $Al_2O_3$, $Si_3N_4$, MgO or any single metal or mixed metal combination of oxides, nitrides and carbides.

(14) A supper low-friction lubrication assembly as described in any of (1) to (13), wherein the second member comprises at lease one selected from the group consisting of silicon carboxide, oxinitride and carbonitride, a material formed of elements having a chemical affinity and a tendency to form hydroxides (for example Metal (OH)x), diamond and diamond-like carbon.

(15) A low-friction lubrication assembly as described in any of (1) to (12), wherein the second member comprises at least one selected from the group consisting of C, Fe, Al, Mg, Cu, Fe alloy, Al alloy, Mg alloy and Cu alloy.

(16) A low-friction lubrication assembly as described in any of (1) to (15), wherein the oxygen containing compound has at least one hydroxyl group attached to the sliding surface.

(17) A low-friction lubrication assembly as described in any of (1) to (16), wherein the oxygen containing compound comprises at least one of the group consisting of an alcohol, a carboxylic acid, an ester, an ether, a ketone, an aldehyde and a carbonate, and/or a derivative of at least one of the group consisting of an alcohol, a carboxylic acid, an ester, an ether, a ketone, an aldehyde and a carbonate.

(18) A supper low-friction lubrication assembly as described in any of (1) to (17), wherein the oxygen containing compound contains one or more OH groups.

(19) A low-friction lubrication assembly as described in any of (1) to (17), wherein the oxygen containing compound comprises at least one selected from the group consisting of poly alpha-olefin (PAO), glycerol monooleate (GMO), Glycerol, $H_2O$ and peroxides.

(20) A low-friction lubrication assembly as described in (1) to (19), wherein the oxygen containing compound comprises $H_2O_2$, a mixture of $H_2O$ and $H_2O_2$, or a mixture of $H_2O_2$ and glycerol.

(21) A low-friction lubrication assembly as described in any of (1) to (19), wherein the oxygen containing compound comprises polyalcohol.

(22) A low-friction lubrication assembly as described in (21), wherein the polyalcohol comprises at least one selected from the group consisting of inositol, pyrogallol, urushiol, pyrocatechol, resorcinol, hydroquinone, fullerenol, penthaerythrithol, other saccharides, and their isomers, derivatives and substitution compounds.

(23) A low-friction lubrication assembly as described in (1) to (22), wherein the oxygen containing compound comprises a mixture of at least one of the polyalcohols and glycerol.

(24) A low-friction lubrication assembly as described in (1) to (22), wherein the oxygen containing compound comprises a mixture of at least one of the polyalcohols and $H_2O$.

(25) A low-friction lubrication assembly as described in any of (1) to (24), wherein the oxygen containing compound is found in synovial liquid.

(26) A low-friction lubrication assembly as described in any of (1) to (25), wherein the oxygen containing compound is found in lubricin.

(27) A low-friction lubrication assembly as described in any of (1) to (26), wherein the oxygen containing compound is found in lubricin-OH.

(28) A low-function lubrication assembly as described in (1) to (27), wherein the oxygen containing compound is liquid or gaseous, nanoparticles or thin organic deposited films by any available deposition techniques, in particular Langmuir Blodgett films.

(29) A low-friction lubrication assembly as described in any of (1) to (28), wherein the sliding surface of the first member is subject to pretreatment before being slid against the second member.

(30) A low-friction lubrication assembly as described in any of (1) to (29), wherein the sliding surface of the second member is further subject to pretreatment before being slid against the first member.

(31) A low-friction lubrication assembly as described in (29) to (30), wherein said pretreatment comprises cleaning; mechanical activation, in particular polishing; chemical treatment by application of the oxygen containing compound; or physical treatment by laser treatment, ion beam treatment or electron beam treatment.

(32) A supper low-friction lubrication assembly as described in (31), wherein the oxygen containing compound for carrying out the chemical treatment is high in volatility.

(33) A supper low-friction lubrication assembly as described in (32), wherein the oxygen containing compound high in volatility is $H_2O_2$.

(34) A low-friction lubrication assembly as described in any of (1) to (33), wherein the sliding surface of the first member is hydrogen-free before application of the oxygen containing compound and establishing sliding contact to the second member but comprises an OH-terminated sliding surface upon entering into sliding contact with the second member, under preceding or simultaneous into application of the oxygen containing compound on the sliding surface of the first member.

(35) A combustion engine, wherein the low-friction lubrication assembly as described in (1) to (34) is applied to the combustion engine.

(36) A medical device, wherein the low-friction lubrication assembly as described in (1) to (34) is applied to the medical device.

(37) A medical device as described in (36), wherein the medical device is endoscope, catheter, syringe, needle, blood collection tube, or medical electronic pump.

(38) A shaver, wherein the low-friction lubrication assembly as described in (1) to (34) is applied to the shaver.

(39) A watch, a compressor, a pump, a gear, a machining tool (bite) and a bearing, wherein the low-friction lubrication assembly as described in (1) to (34) is applied to the watch, the compressor, the pump, the gear, the machining tool and the bearing.

(40) A precision processing, wherein the low-friction lubrication assembly as described in (1) to (34) is applied to the precision processing.

(41) A precision processing as described in (40), wherein the precision processing is a cold processing or a warm processing.

(42) A precision instrument, wherein the low friction lubrication assembly as described in (1) to (34) is applied to the precision instrument.

(43) A watch to which a low-friction lubrication assembly is applied, wherein the low-friction lubrication assembly comprises: a first member relatively slidable against a second member, the first member having chemical affinity with an OH-group on its sliding surface; and one or more oxygen containing compounds located on the sliding surface of the first member and being able to produce a tribofilm to be located on the sliding surface of the first member having the chemical affinity, through hydrogen bond interactions with the OH-group.

(44) A watch as described in (43), wherein the second member further has chemical affinity with an OH group, and the tribofilm is also able to be formed on a sliding surface of the second member through hydrogen bond interactions with the OH-group in response to sliding motion.

(45) A watch as described in (43), wherein at least one OH group termination is provided onto the sliding surface of the first member after a certain sliding motion.

(46) A watch as described in (43) or (45), wherein the tribofilm is formed to be located on the sliding surface of the first member through hydrogen bond interactions between at least one OH termination provided to the surface of the first member and an OH group in the oxygen containing compound.

(47) A watch as described in any of (43) to (46), wherein at least one OH group termination is further provided onto the sliding surface of the second member after a certain sliding motion.

(48) A watch as described in any of (43) to (47), wherein the tribofilm is further formed to be located on the sliding surface of the second member through hydrogen bond interactions between at least one OH termination provided to the surface of the second member and an OH group in the oxygen containing compound.

(49) A watch as described in any of (43) to (48), wherein the first member contains at least $Al_2O_3$.

(50) A watch as described in any of (43) to (49), wherein the second member contains at least one selected from the group consisting of Fe and Fe alloy.

(51) A watch as described in any of (43) to (50), wherein the oxygen containing compound contains at least one selected from the group consisting of poly alpha-olefin (PAO), glycerol monooleate (GMO) and glycerol.

(52) A watch as described in any of (43) to (51), wherein the first member is made of $Al_2O_3$, the second member is made of Fe or Fe alloy, and the oxygen containing compound is glycerol.

(53) A watch as described in any of (43) to (52), wherein the first member made of $Al_2O_3$ is a fluke disposed in an anchor, and the second member made of Fe or Fe alloy is an escapement wheel.

BRIEF DESCRIPTION OF THE DRAWINGS

FIG. 13 A graph showing a performance of a ruby ($Al_2O_3$)/ steel system using glycerol containing 1% by weight of inositol as a lubricant.

Figure 1:
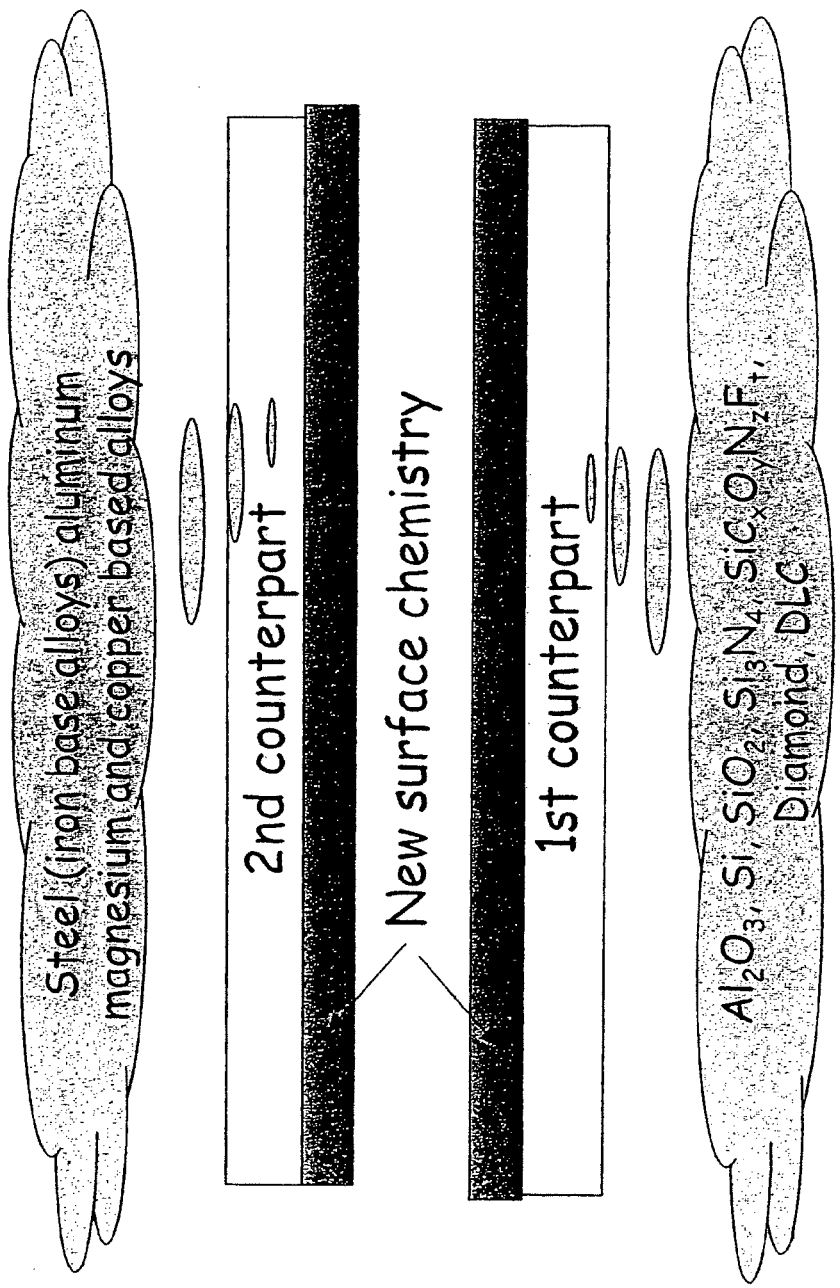
FIG. 1 A schematic general outline of a low friction assembly being formed of different first and second members.
Figure 2:
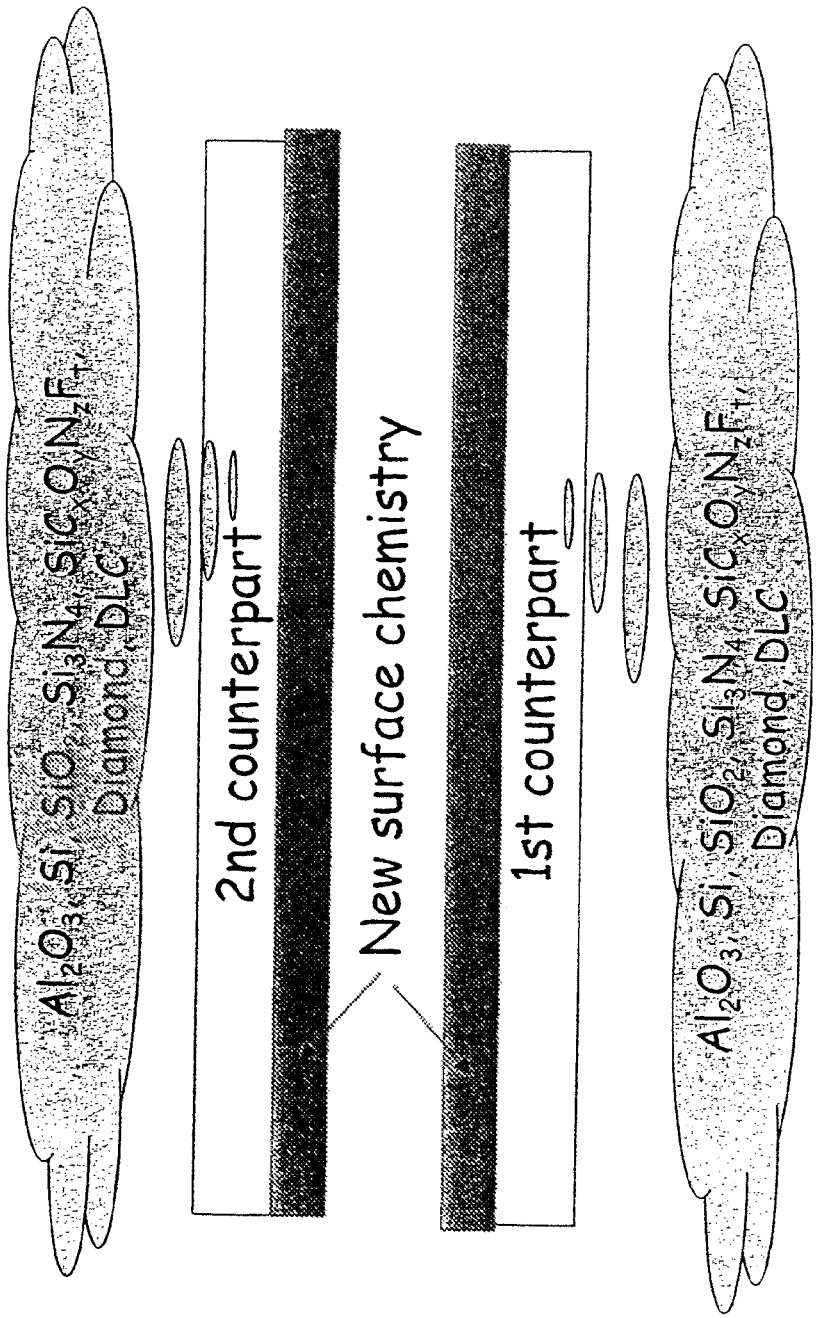
FIG. 2 A schematic representation of the low friction assembly using similar first and second members.
Figure 3:
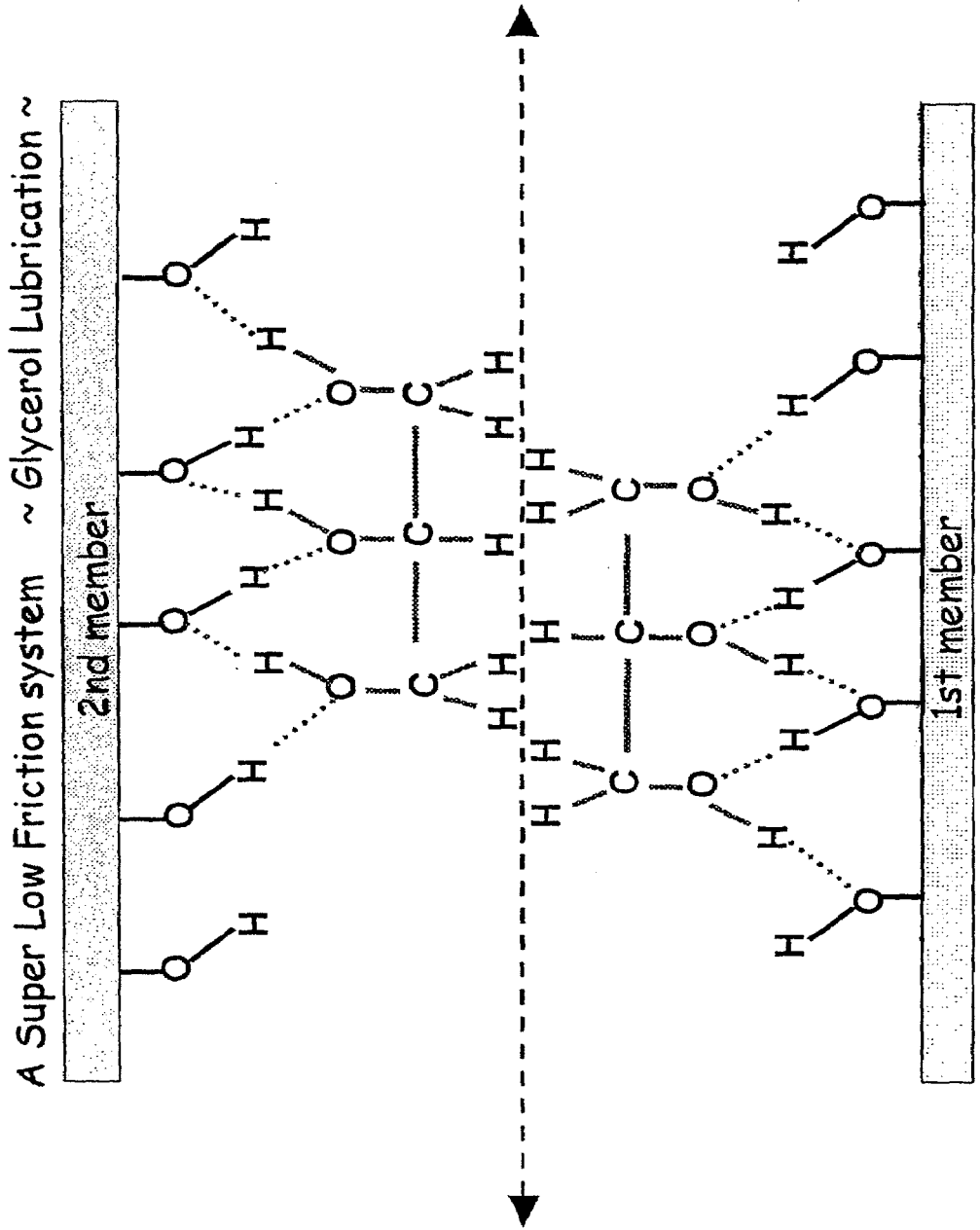
FIG. 3 A view representing a low friction assembly having a first and a second member with an OH-terminated surface and a monolayer of glycerol as a lubricating agent on each surface. The spotted lines indicate hydrogen bonds and the sliding interface.
Figure 4:
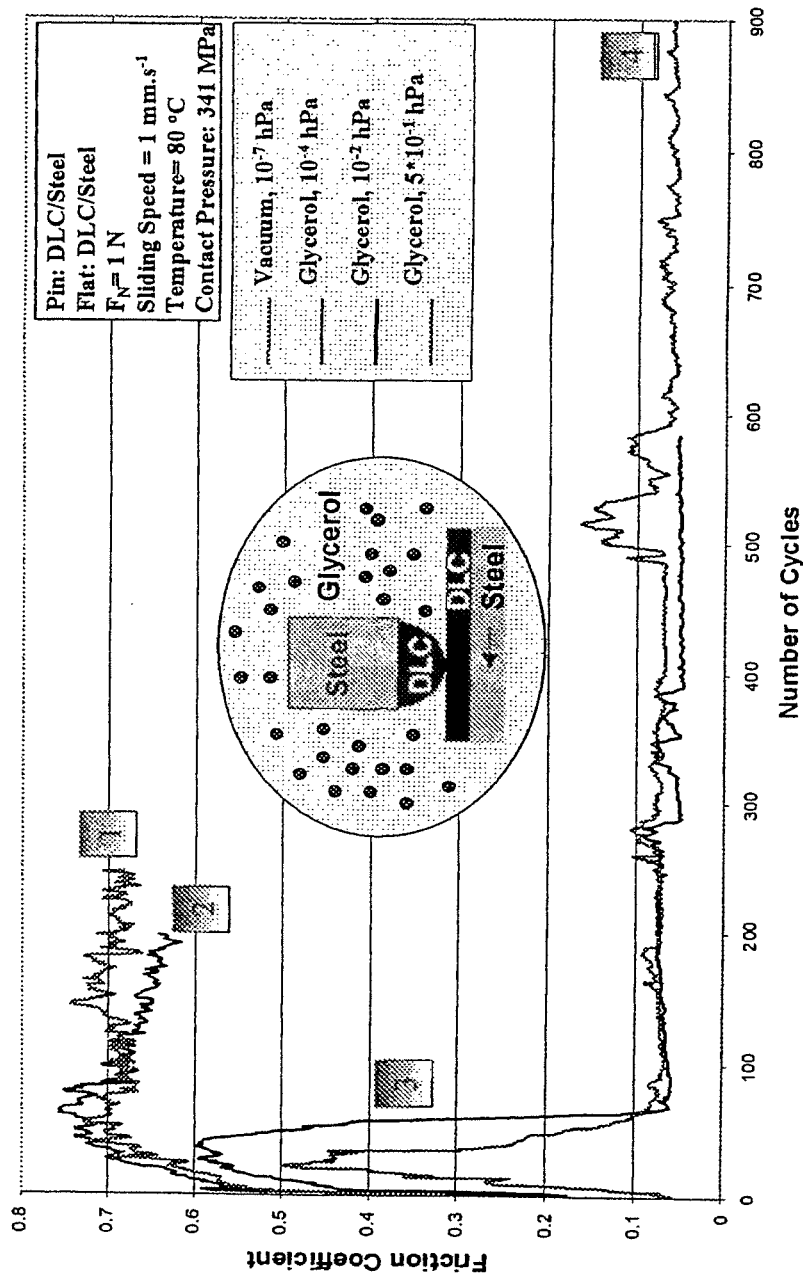
FIG. 4 A graph showing performances of a hydrogen-free DLC/hydrogen-free DLC system with glycerol lubrication.
Figure 5:
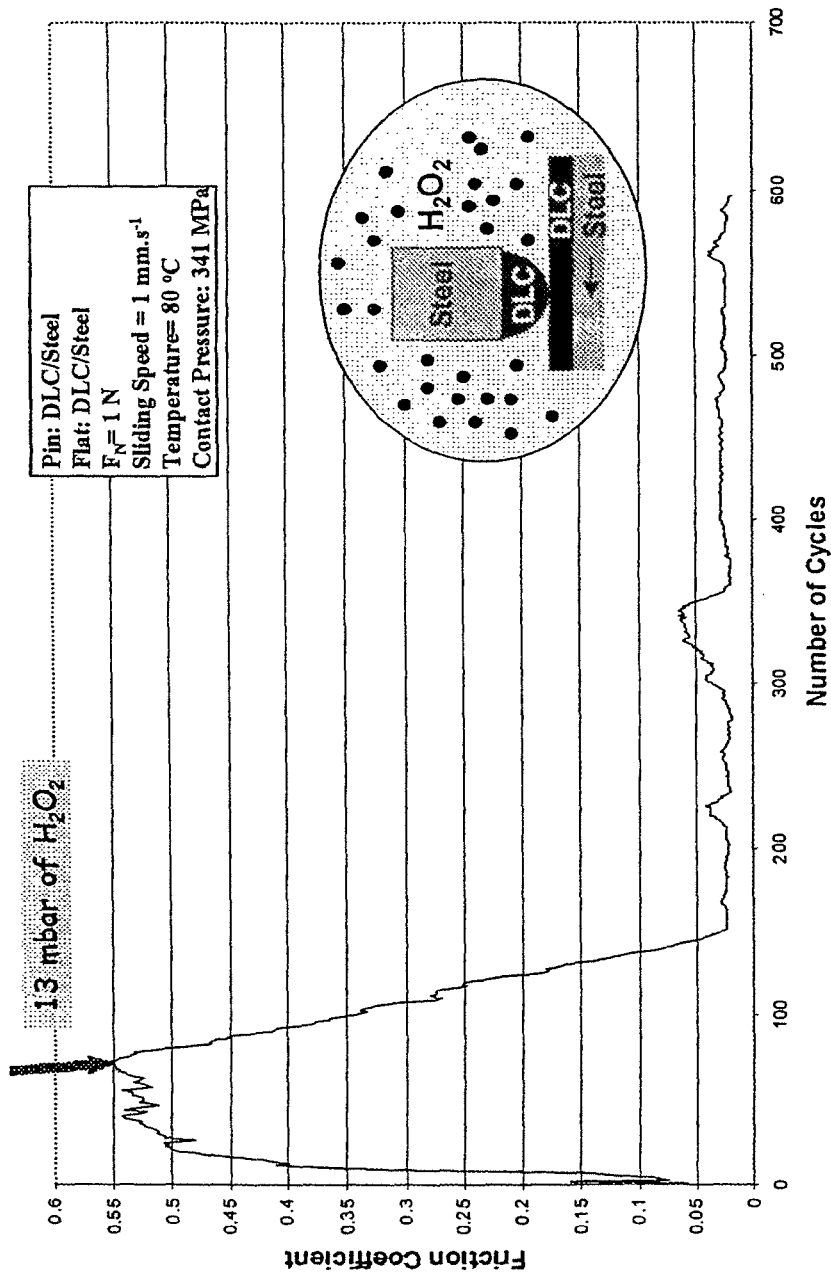
FIG. 5 A graph showing performances of a hydrogen-free/ hydrogen-free DLC system with gaseous $H_2O_2$ lubrication.
Figure 6:
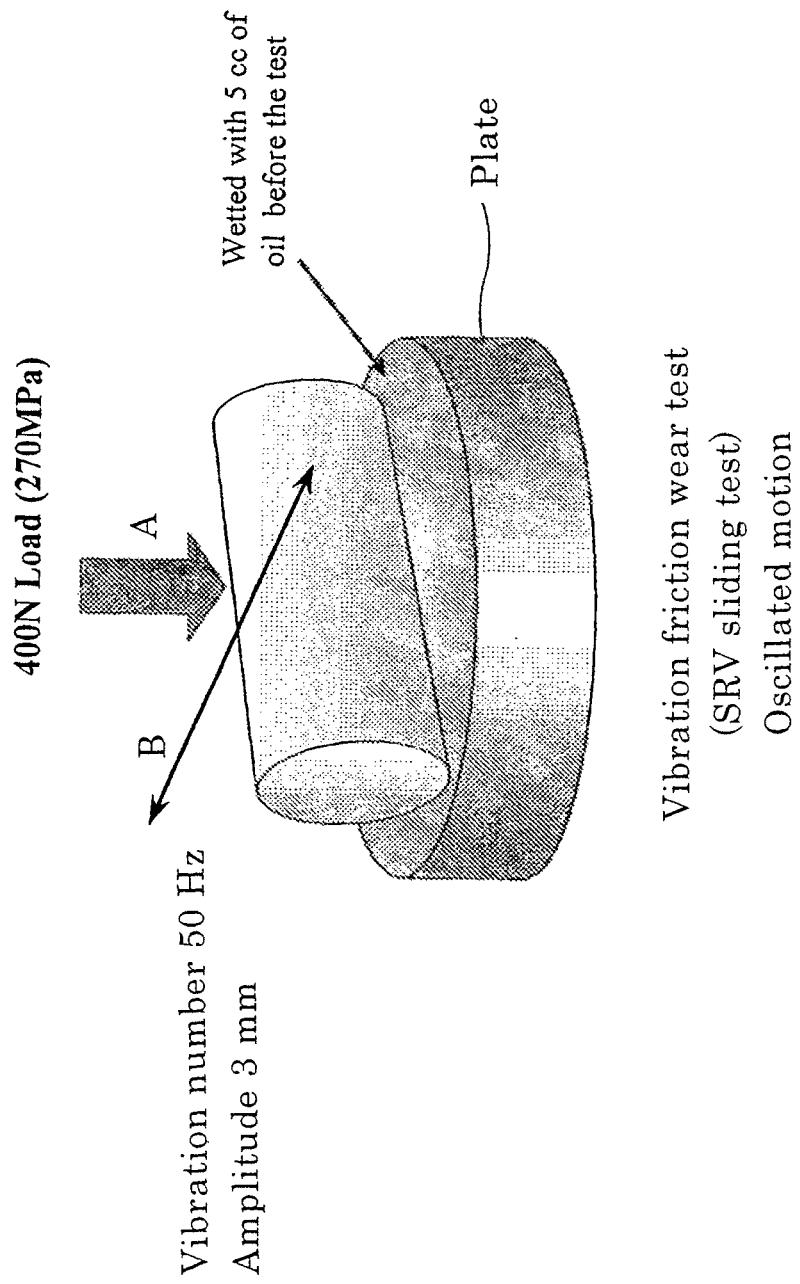
FIG. 6 A schematic view showing a test condition of a vibration friction wear testing machine (SRV sliding test).
Figure 7:
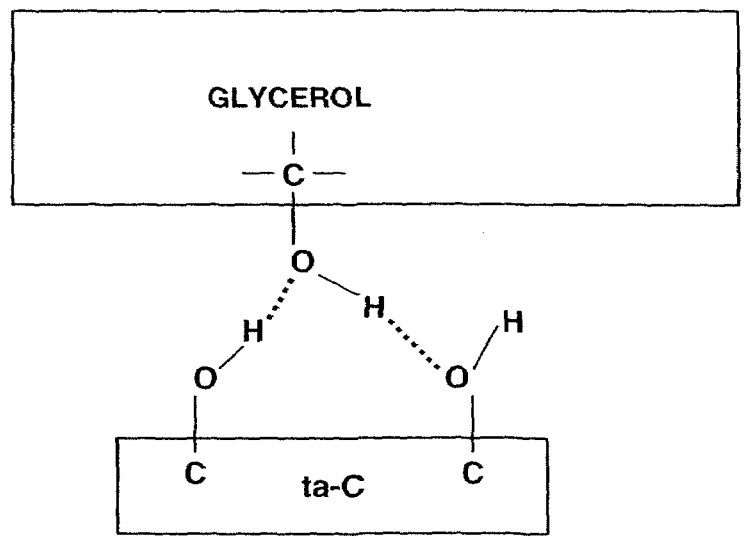
FIG. 7 An explanatory illustration showing bonding between glycerol and ta-C.
Figure 8:
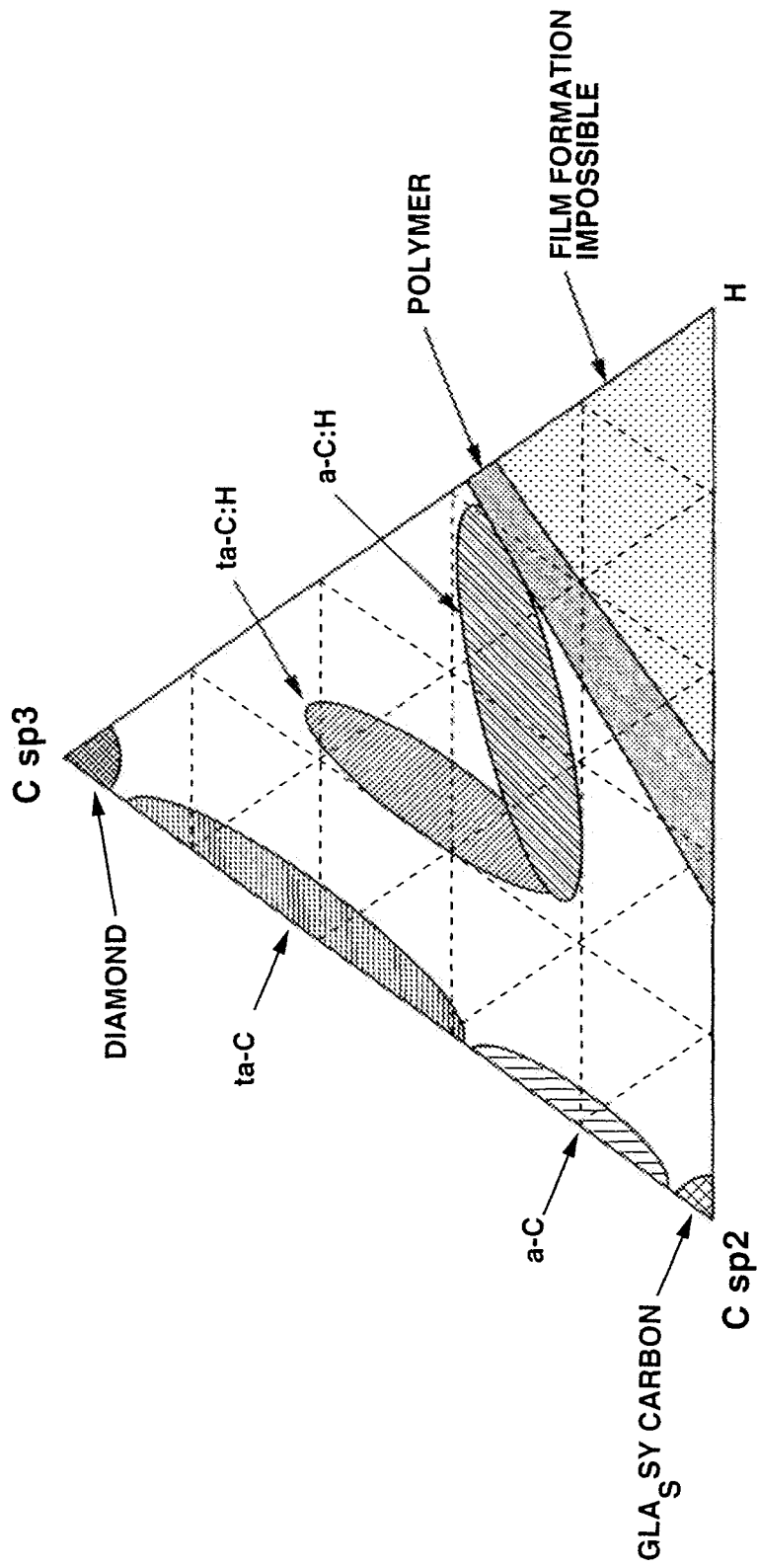
FIG. 8 A ternary state diagram showing ranges of ta-C and a-C.
Figure 9:
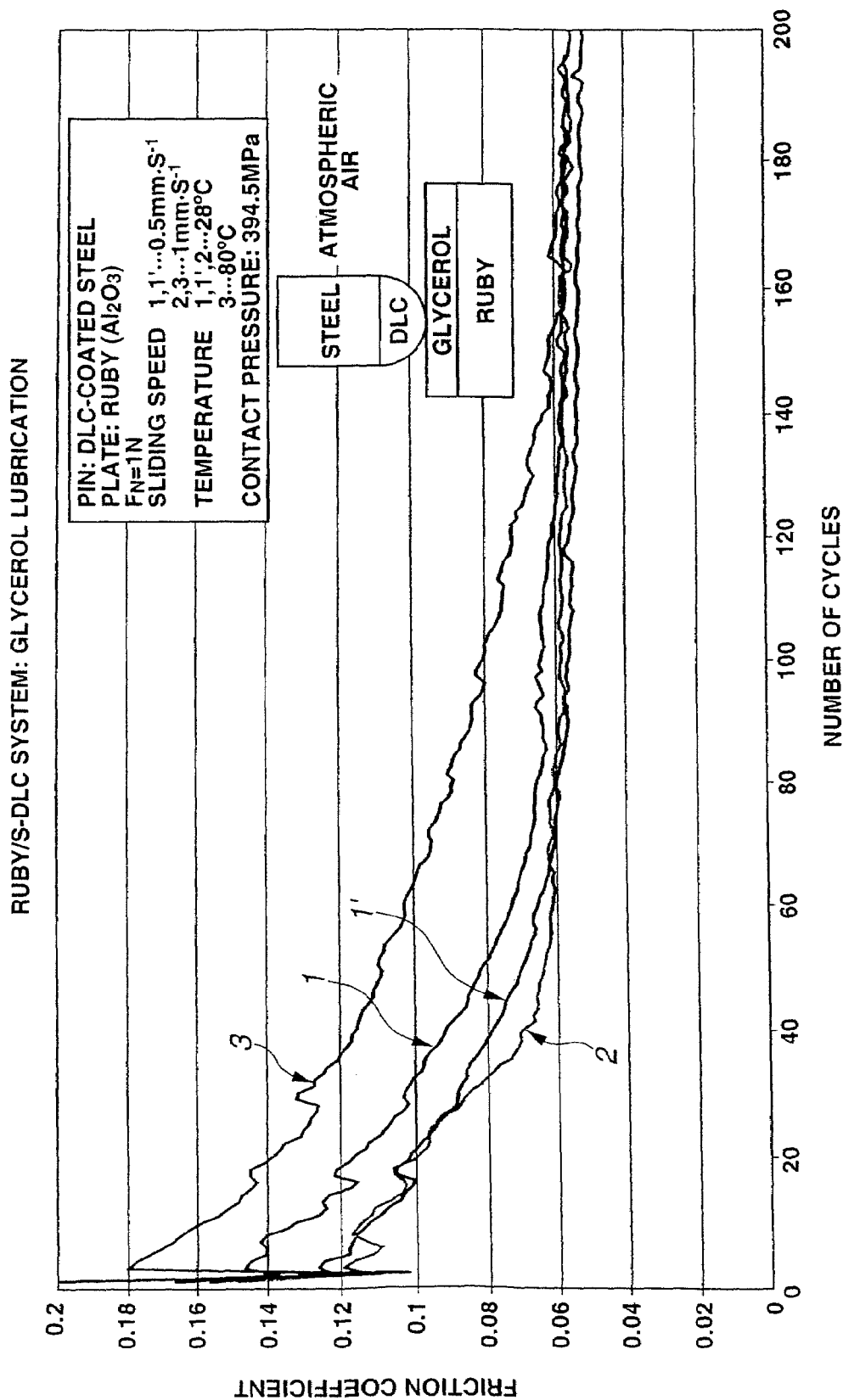
FIG. 9 A graph showing performances of a ruby ($Al_2O_3$)/ hydrogen-free DLC system with glycerol lubrication.
Figure 10:
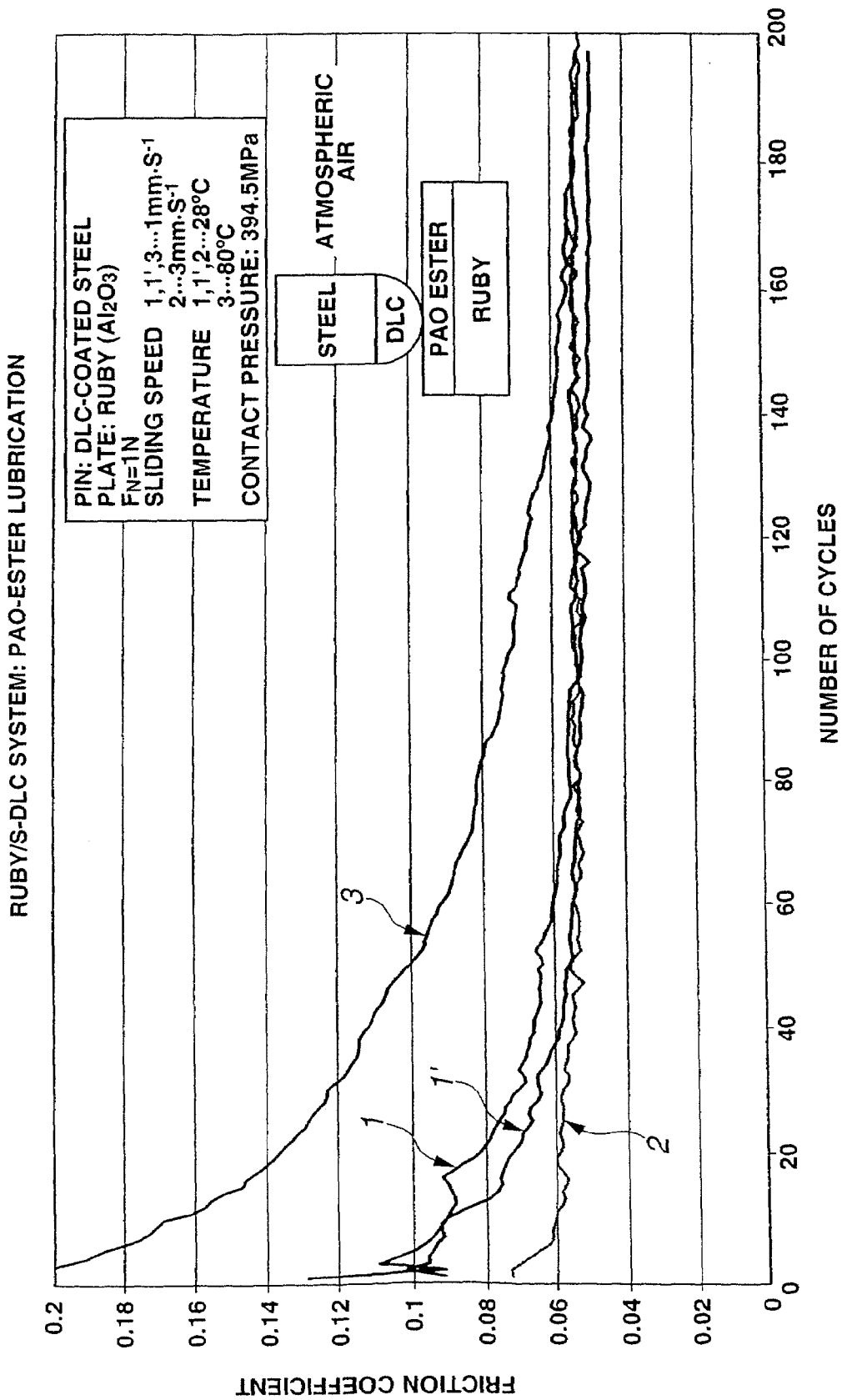
FIG. 10 A graph showing performances of a ruby ($Al_2O_3$)/ hydrogen-free DLC system with PAO-ester lubrication.
Figure 11:
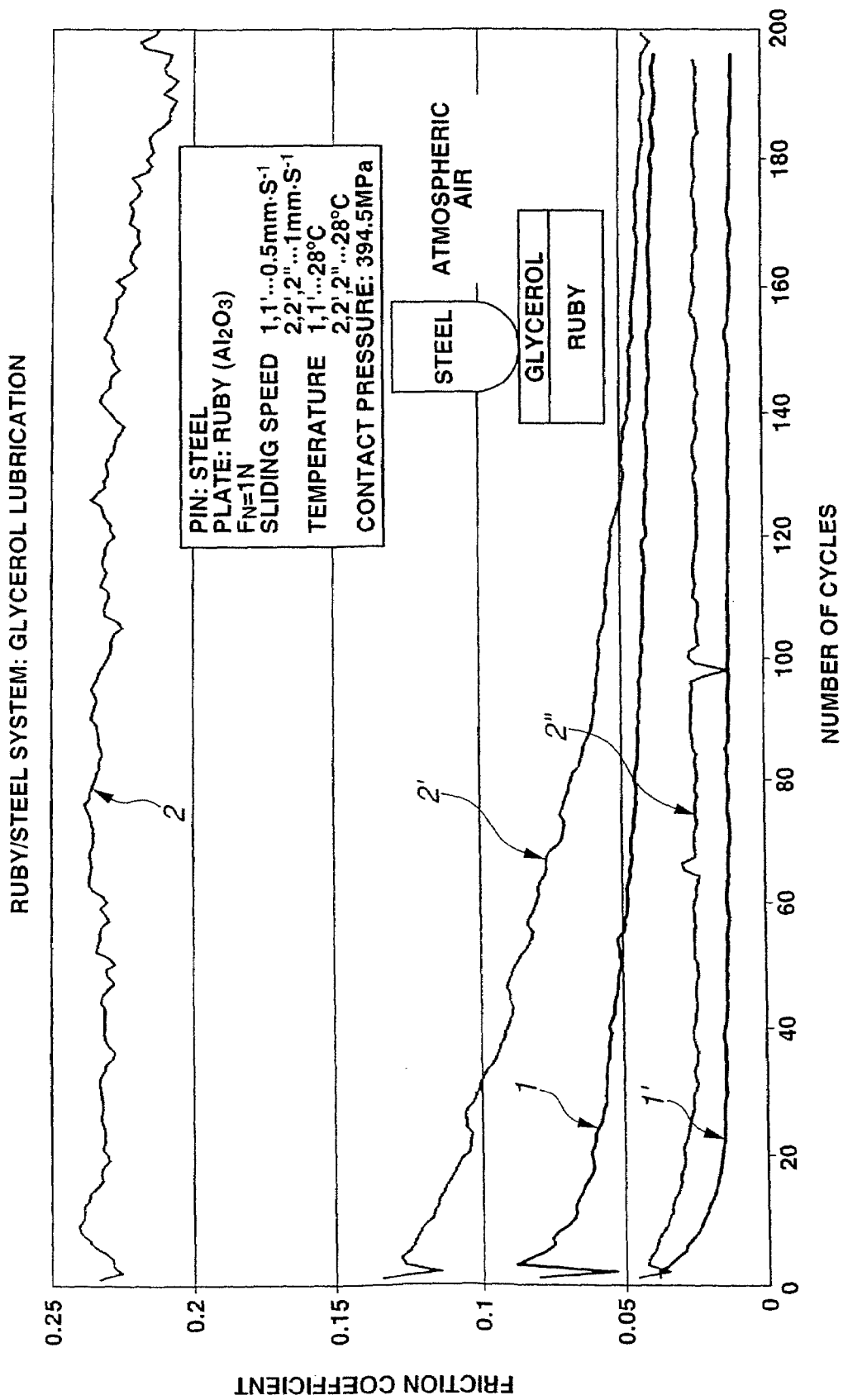
FIG. 11 A graph showing performances of a ruby ($Al_2O_3$)/ steel system with glycerol lubrication.
Figure 12:
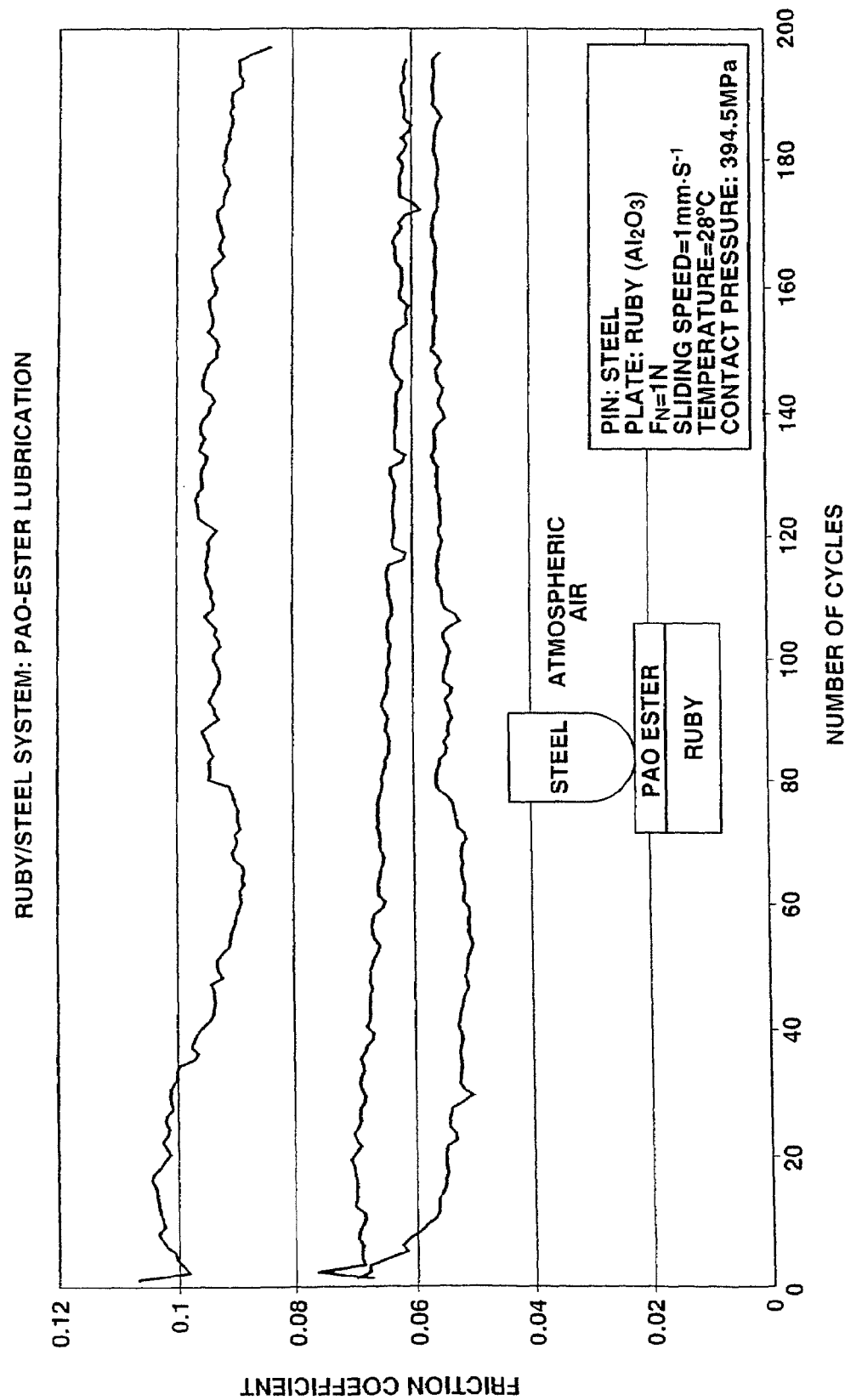
FIG. 12 A graph showing performances of a ruby ($Al_2O_3$)/ steel system with PAO-ester lubrication.

What is claimed is:

1. A watch comprising a low-friction lubrication assembly, characterized in that the low-friction lubrication assembly comprises:

a first member relatively slidable against a second member, the first member having chemical affinity with an OH-group on its sliding surface; and one or more oxygen containing compounds located on the sliding surface of the first member and being able to produce a tribofilm to be located on the sliding surface of the first member having the chemical affinity, through hydrogen bond interactions with the OH-group, wherein the first member includes a coating formed of a diamond-like carbon of ta-C type on its sliding surface, wherein the one or more oxygen containing compounds include glycerol, wherein the second member has a chemical affinity with an OH-group on its sliding surface, and the tribofilm is able to be formed on the sliding surface of the second member through hydrogen bond interactions with the OH-group in response to a sliding motion of the first member against the second member, and wherein the second member includes a coating formed of a diamond-like carbon of the ta-C type on its sliding surface.

2. A low-friction lubrication assembly comprising:
a first member relatively slidable against a second member, the first member having chemical affinity with an OH-group on its sliding surface; and
one or more oxygen containing compounds located on the sliding surface of the first member and being able to produce a tribofilm to be located on the sliding surface of the first member having the chemical affinity, through hydrogen bond interactions with the OH-group,
wherein the first member includes a coating formed of a diamond-like carbon of ta-C type on its sliding surface,
wherein the one or more oxygen containing compounds include glycerol,
wherein the second member has a chemical affinity with an OH-group on its sliding surface, and the tribofilm is able to be formed on the sliding surface of the second member through hydrogen bond interactions with the OH-group in response to a sliding motion of the first member against the second member,
wherein the second member includes a coating formed of a diamond-like carbon of the ta-C type on its sliding surface, and
wherein the first member comprises at least one selected from the group consisting of silicon carboxide, oxinitride and carbonitride, a material formed of elements having a chemical affinity and tendency to form hydroxides, and diamond.

3. A low-friction lubrication assembly comprising:
a first member relatively slidable against a second member, the first member having chemical affinity with an OH-group on its sliding surface; and
one or more oxygen containing compounds located on the sliding surface of the first member and being able to produce a tribofilm to be located on the sliding surface of the first member having the chemical affinity, through hydrogen bond interactions with the OH-group,
wherein the first member includes a coating formed of a diamond-like carbon of ta-C type on its sliding surface,
wherein the one or more oxygen containing compounds include glycerol,
wherein the second member has a chemical affinity with an OH-group on its sliding surface, and the tribofilm is able to be formed on the sliding surface of the second member through hydrogen bond interactions with the OH-group in response to a sliding motion of the first member against the second member,
wherein the second member includes a coating formed of a diamond-like carbon of the ta-C type on its sliding surface, and
wherein the second member comprises at least one selected from the group consisting of silicon carboxide, oxinitride and carbonitride, a material formed of elements having a chemical affinity and a tendency to form hydroxides, and diamond.

* * * * *